US008031192B2

(12) United States Patent
Cerny (10) Patent No.: US 8,031,192 B2
(45) Date of Patent: Oct. 4, 2011

(54) SYSTEM AND METHOD FOR GENERATING ADDITIONAL POLYGONS WITHIN THE CONTOURS OF A RENDERED OBJECT TO CONTROL LEVELS OF DETAIL (75) Inventor: Mark Evan Cerny, Los Angeles, CA (US)

(73) Assignee: Sony Computer Entertainment America LLC, Foster City, CA (US)

(*) Notice: Subject to any disclaimer, the term of this patent is extended or adjusted under 35 U.S.C. 154(b) by 176 days.

(21) Appl. No.: 11/455,273

(22) Filed: Jun. 15, 2006

(65) Prior Publication Data
US 2007/0002049 A1 Jan. 4, 2007

Related U.S. Application Data (63) Continuation of application No. 10/267,234, filed on Oct. 8, 2002, now Pat. No. 7,081,893.

(60) Provisional application No. 60/328,453, filed on Oct. 10, 2001.

(51) Int. Cl.
G06T 15/00 (2006.01)
G06T 17/00 (2006.01)
(52) U.S. Cl. ......... 345/426; 345/419; 345/420; 345/423
(58) Field of Classification Search .................. 345/430, 345/441, 581, 619, 418–428
See application file for complete search history.

(56) References Cited

U.S. PATENT DOCUMENTS

| 5,367,615 A | 11/1994 | Economy et al. |
| 5,590,248 A | 12/1996 | Zarge et al. |
| 5,812,136 A * | 9/1998 | Keondjian ............ 345/419 |
| 5,894,308 A | 4/1999 | Isaacs |
| 6,018,347 A | 1/2000 | Willis |
| 6,100,898 A | 8/2000 | Malamy et al. |
| 6,130,673 A * | 10/2000 | Pulli et al. ............ 345/428 |
| 6,137,492 A * | 10/2000 | Hoppe ............ 345/420 |
| 6,157,386 A | 12/2000 | Wilde |
| 6,222,555 B1 | 4/2001 | Christofferson et al. |
| 6,288,730 B1 | 9/2001 | Duluk, Jr. et al. |

(Continued)

FOREIGN PATENT DOCUMENTS

JP 07-271999 10/1995

(Continued)

OTHER PUBLICATIONS

Gueziec A et al., "Simplicial Maps for Progressive Transmission of Polygonal Surfaces", Proceedings. VRML 98 Third Symposium on the Virtual Reality Modeling Language ACM, 1998, pp. 25-31, 131, New York, NY, USA.

(Continued)

Primary Examiner — Amare Mengistu
Assistant Examiner — Aaron M Guertin
(74) Attorney, Agent, or Firm — Lewis and Roca LLP (57) ABSTRACT A method for control over the level of detail within a rendered object is provided. The method may be a program embodied on a machine readable medium. The method identifies a set of parent vertices defining a polygon within a rendered object. A child vertex of the set of parent vertices is generated and pushed toward a predetermined location within the anticipated contours of the rendered object. One of the parent vertices is then connected to the child vertex to generate an additional polygon. A graphics engine configured to control a level of detail in a rendered object through the generation of additional polygons in the rendered object is also provided.

15 Claims, 10 Drawing Sheets

U.S. PATENT DOCUMENTS

| | | | |
|---|---|---|---|
| 6,348,921 B1 * | 2/2002 | Zhao et al. | 345/428 |
| 6,356,263 B2 | 3/2002 | Migdal et al. | |
| 6,392,647 B1 * | 5/2002 | Migdal et al. | 345/423 |
| 6,396,490 B1 * | 5/2002 | Gorman | 345/419 |
| 6,426,750 B1 * | 7/2002 | Hoppe | 345/428 |
| 6,573,890 B1 * | 6/2003 | Lengyel | 345/419 |
| 6,611,267 B2 | 8/2003 | Migdal et al. | |
| 6,798,411 B1 * | 9/2004 | Gorman et al. | 345/428 |
| 7,081,893 B2 | 7/2006 | Cerny | |
| 2002/0162081 A1 * | 10/2002 | Solomon | 716/11 |
| 2002/0167518 A1 * | 11/2002 | Migdal et al. | 345/428 |

FOREIGN PATENT DOCUMENTS

JP 07-334664 12/1995

OTHER PUBLICATIONS

Hayano, Masayuki et al., "Mesh Simplification Using Edge Operation with Feature Detection," Inf. Proc. Soc. of Japan SIG Technical Report, Feb. 27, 1998, vol. 98, No. 16.

Nakamura, Hiroko et al., "Adaptive Transmission of Polygonal Patch Datasets . . . ," Inf. Proc. Soc. of Japan SIG Technical Report, Sep. 8, 2000, vol. 2000, No. 8.

* cited by examiner

SYSTEM AND METHOD FOR GENERATING ADDITIONAL POLYGONS WITHIN THE CONTOURS OF A RENDERED OBJECT TO CONTROL LEVELS OF DETAIL

CROSS-REFERENCE TO RELATED APPLICATIONS

This application is a continuation and claims the priority benefit of U.S. patent application Ser. No. 10/267,234, entitled "System and Method for Point Pushing to Render Polygons in Environments with Changing Levels of Detail," filed on Oct. 8, 2002 and now U.S. Pat. No. 7,081,893, which claims the priority benefit of U.S. Provisional Patent Application No. 60/328,453, entitled "Point Pushing Method for Calculating Resolution," filed on Oct. 10, 2001. The subject matter of the related applications is hereby incorporated by reference. The related applications are commonly assigned.

BACKGROUND OF THE INVENTION

1. Field of the Invention

This invention relates generally to computer graphics and more specifically to a system and method for generating additional polygons within the contours of a rendered object to control levels of detail.

2. Description of the Background Art

The resolution of a rendered object generally relates to the number of polygons used to generate that object. A rendered object that contains a greater number of polygons over a given area typically has a higher resolution than an object that contains fewer polygons over the same area.

Graphics engines or graphics software typically implement a technique known as "stripping" when rendering objects. Stripping is a method of generating polygons that enables processors, usually central processing units and graphics processing units, to generate large numbers of polygons while using relatively little processing power. Stripping thereby allows graphics engines or graphics software to render higher resolution objects more quickly and inexpensively. For this reason, producing high resolution graphics for video games and other computer programs and applications that utilize stripping algorithms is simpler and less expensive than producing high resolution graphics for games, programs and applications that do not utilize stripping algorithms.

Stripping generally entails linking polygons in a strip such that a graphics engine or graphics software can generate an additional polygon simply by creating new vertices off one end of the strip and connecting those new vertices to the vertices of the last polygon on that end the strip. The additional polygon and the polygon that was last in the strip share the vertices to which the graphics engine or graphics software connected the new vertices. A triangle is the most commonly used polygon in stripping algorithms because a graphics engine or graphics software can render an additional triangle in a strip by creating only one new vertex and connecting that vertex to each of two vertices of the last triangle in the strip.

When rendering objects, graphics engines or graphics software also typically divide an image screen into different arrays of polygons, sometimes referred to as "meshes." At any given time, a particular mesh has one or more levels of resolution or levels of detail (LOD) that correspond to the different levels of resolution of the parts of the rendered object(s) represented in the mesh. A higher LOD area of a mesh contains both smaller polygons and a greater number of polygons than a lower LOD area of the mesh contains. The boundary between a higher LOD area of a mesh and a lower LOD area of a mesh is referred to as an "LOD boundary."

When an LOD boundary intersects one of the polygons in a mesh, the graphics engine or graphics software generates additional polygons on the higher LOD side of the LOD boundary to add detail to that part of the mesh. The area of intersection between the LOD boundary and a side of one of the additional polygons is referred to as a "T-junction." The result is that only part of the original polygon resides on the lower LOD side of the T-junction (referred to as the "low resolution patch") and several smaller polygons reside on the higher LOD side of the T-junction (referred to as the "high resolution patch"). Frequently, the low resolution patch and the high resolution patch do not align properly, causing a "crack" in the screen image. A crack is where part of a background image appears in a higher resolution part of a rendered object. This same phenomenon also can occur when a graphics engine or graphics software removes detail from part of a mesh located on a lower LOD side of an LOD boundary.

Several schemes exist that address the T-junction problem described above. These prior art solutions, however, tend to compromise the ability of the graphics engine or graphics software to perform stripping. The consequence is that systems designed to address the T-junction problem lose the efficiencies of stripping and therefore produce lower resolution graphics, and systems that preserve stripping frequently produce graphics that show cracks.

SUMMARY OF THE INVENTION

One embodiment of the present invention provides for controlling a level of detail in a rendered object comprises a graphics engine configured to generate additional polygons in the rendered object. The graphics engine identifies a set of parent vertices defining a polygon within the rendered object. The graphics engine generates a child vertex of the set of the parent vertices. The child vertex is pushed by the graphics engine toward a predetermined location within the anticipated contours of the rendered object. To generate an additional polygon, the graphics engine connects one of the parent vertices to the child vertex. The additional polygon is associated with the level of detail in the rendered object.

The graphics engine may connect the child vertex to another child vertex to generate a second additional polygon. The child vertex may be identified as one of the parent vertices of the additional polygon. Additional polygons may be generated if the rendered object moves into an area having a higher level of detail. The graphics engine may use a stripping algorithm to generate the additional polygon. The graphics engine may remove a polygon from the rendered object by pushing one of the parent vertices of the polygon towards another of the parent vertices.

A method for controlling a level of detail within the rendered object may be a program embodied on a machine readable medium. The method begins by identifying a set of parent vertices defining a polygon within a rendered object. The next steps comprise generating a child vertex of the set of parent vertices and pushing the child vertex toward a predetermined location within the anticipated contours of the rendered object. Next, the method involves connecting one of the parent vertices to the child vertex to generate an additional polygon. The additional polygon is associated with the level of detail in the rendered object.

DETAILED DESCRIPTION

Figure 1:
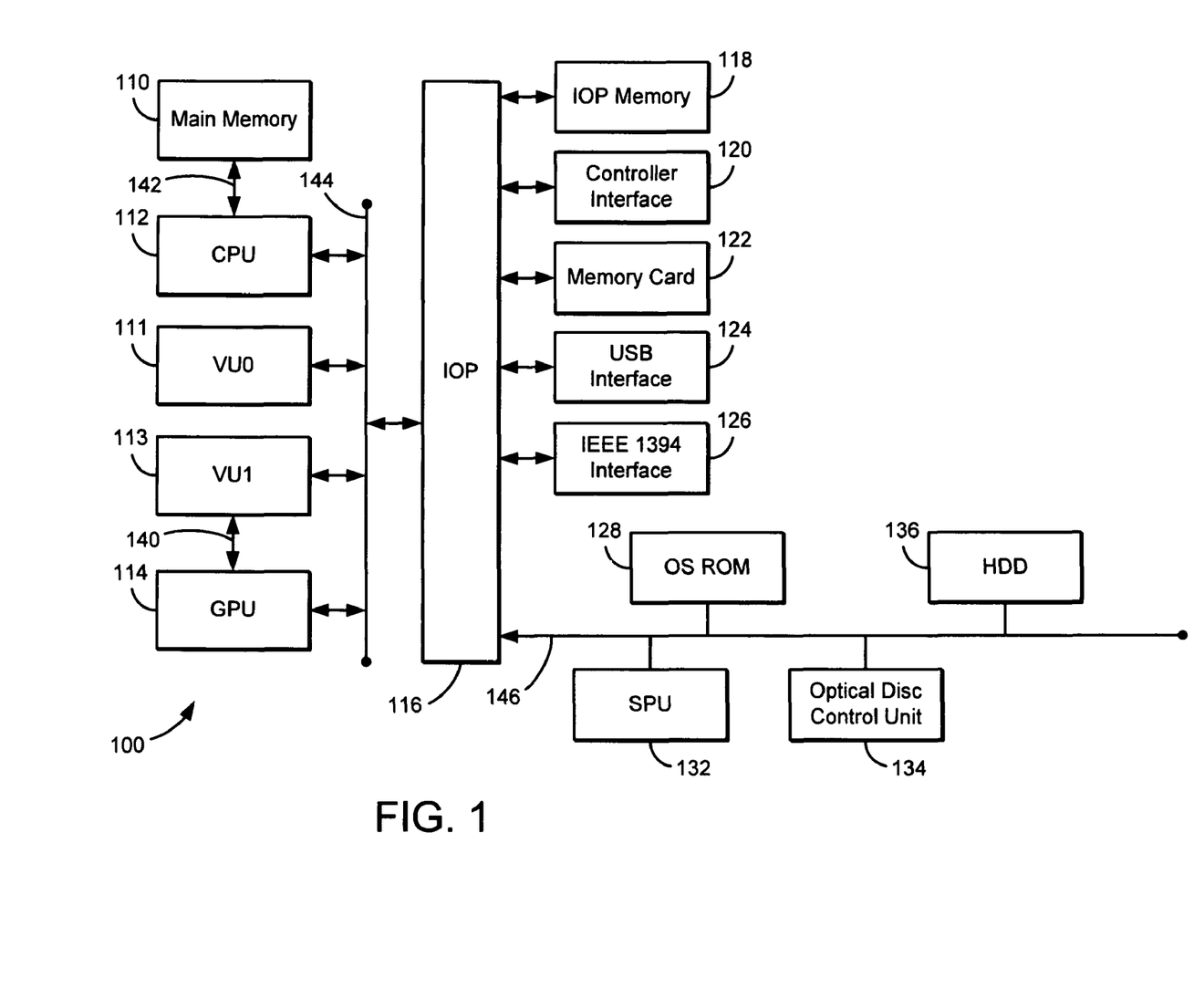
FIG. 1 is a block diagram of one embodiment of an electronic entertainment system, according to the invention.

FIG. 1 is a block diagram of one embodiment of an electronic entertainment system 100, according to the invention. System 100 includes, but is not limited to, a main memory 110, a central processing unit (CPU) 112, vector processing units VU0 111 and VU1 113, a graphics processing unit (GPU) 114, an input/output processor (IOP) 116, an IOP memory 118, a controller interface 120, a memory card 122, a Universal Serial Bus (USB) interface 124 and an IEEE 1394 interface 126. System 100 also includes an operating system read-only memory (OS ROM) 128, a sound processing unit (SPU) 132, an optical disc control unit 134 and a hard disc drive (HDD) 136, which are connected via a bus 146 to IOP 116. System 100 is preferably an electronic gaming console; however, system 100 may also be implemented as any type of general-purpose computer, set-top box or hand-held gaming device.

CPU 112, VU0 111, VU1 113, GPU 114 and IOP 116 communicate via a system bus 144. CPU 112 communicates with main memory 110 via a dedicated bus 142. VU1 113 and GPU 114 may also communicate via a dedicated bus 140. CPU 112 executes programs stored in OS ROM 128 and main memory 110. Main memory 110 may contain prestored programs and may also contain programs transferred via IOP 116 from a CD-ROM, DVD-ROM or other optical disc (not shown) using optical disc control unit 134. IOP 116 controls data exchanges between CPU 112, VU0 111, VU1 113, GPU 114 and other devices of system 100, such as controller interface 120.

GPU 114 executes drawing instructions from CPU 112 and VU0 111 to produce images for display on a display device (not shown). VU1 113 transforms objects from three-dimensional coordinates to two-dimensional coordinates, and sends the two-dimensional coordinates to GPU 114. SPU 132 executes instructions to produce sound signals that are output on an audio device (not shown). In one embodiment of the invention, GPU 114, CPU 112 and certain graphics software in main memory 110 operate in conjunction as a "graphics engine."

A user of system 100 provides instructions via controller interface 120 to CPU 112. For example, the user may instruct CPU 112 to store certain game information on memory card 122 or may instruct a character in a game to perform some specified action. Other devices may be connected to system 100 via USB interface 124 and IEEE 1394 interface 126.

Figure 2:
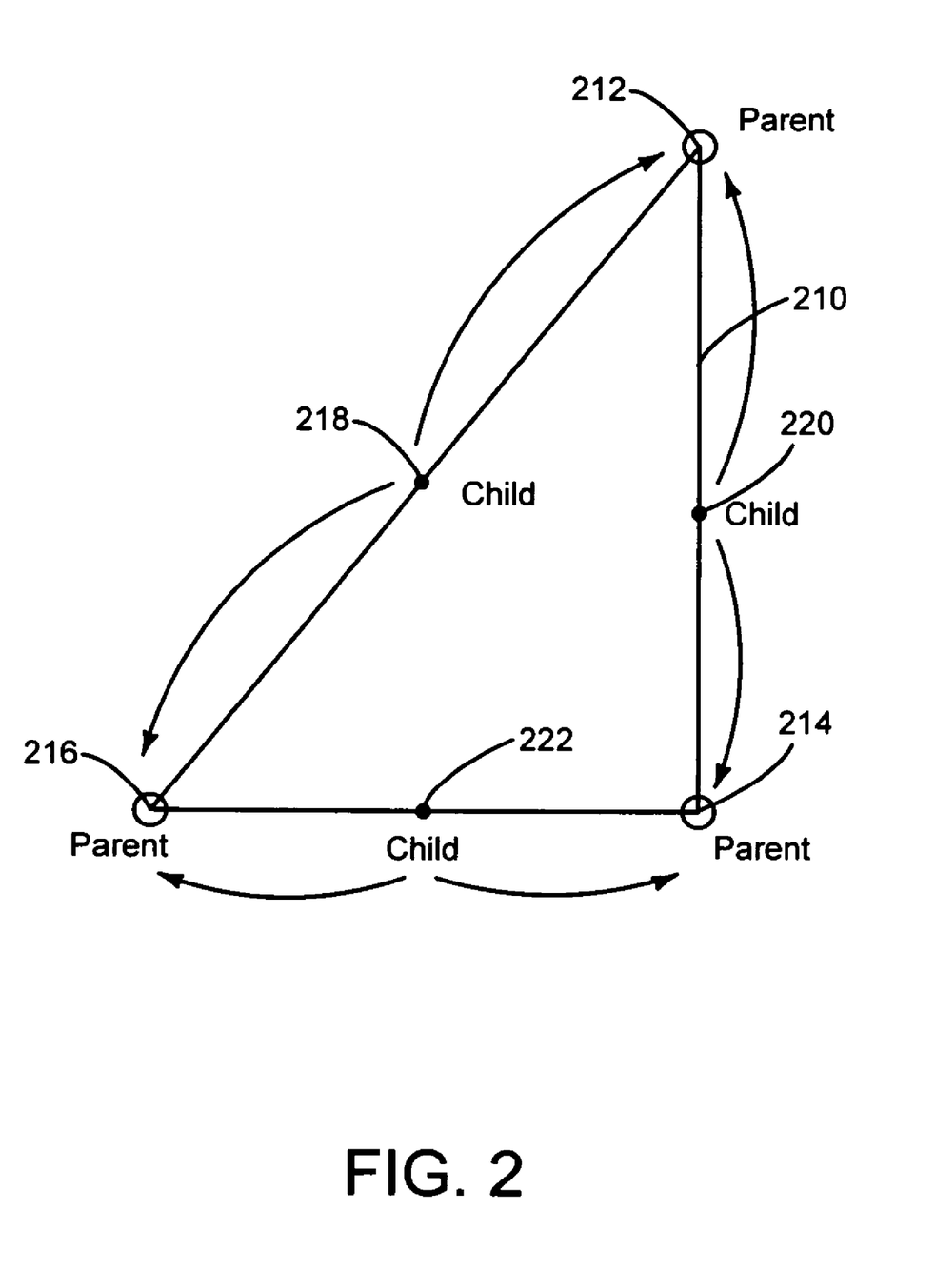
FIG. 2 is a diagram illustrating the relationship between parent vertices and child vertices of a rendered polygon, according to one embodiment of the invention.

FIG. 2 is a diagram illustrating the relationship between parent vertices and child vertices of a rendered polygon 210, according to one embodiment of the invention. As shown, polygon 210 is a triangle, but in other embodiments polygon 210 can be any type of polygon. Polygon 210 has three parent vertices 212, 214 and 216, each of which is a vertex of polygon 210. In addition, polygon 210 has three child vertices 218, 220 and 222, each of which is a point located on one of the sides of polygon 210 such that each set of two parent vertices has one child vertex. For example, child vertex 218 is the child of parent vertices 212 and 216, child vertex 220 is the child of parent vertices 212 and 214 and child vertex 222 is the child of parent vertices 214 and 216. The arrows shown in FIG. 2 point to the parent vertices of each of child vertices 218, 220 and 222. In one embodiment of the invention, a child vertex is the midpoint between its two parent vertices.

Generally speaking, the graphics engine can use parent vertices and child vertices to add detail to or to remove detail from a rendered object (or part of a rendered object). For example, when adding detail, the graphics engine first generates a child vertex for each set of parent vertices of each polygon in the rendered object. The graphics engine then pushes or moves each child vertex to a predetermined location within the anticipated contours of the rendered object (such child vertex movement is referred to as "migration"). The graphics engine also generates additional polygons within the contours of the rendered object by connecting the child vertices to each other as well as to the parent vertices. The graphics engine can use a stripping algorithm or some other method to generate the additional polygons. Each child vertex becomes a vertex of one or more of the additional polygons and, therefore, a parent vertex of each such additional polygon. The result is that the rendered object is comprised of both smaller polygons and a greater number of polygons than it was comprised of originally, thereby giving the rendered object a higher level of detail than it had originally.

When adding yet more detail to the rendered object, the graphics engine repeats the process described above. The only difference is that the rendered object now contains more polygons. The graphics engine first generates a child vertex for each set of parent vertices of each polygon in the rendered object. The graphics engine then causes each child vertex to migrate to a predetermined location within the anticipated contours of the rendered object. The graphics engine again generates additional polygons within the contours of the rendered object by connecting the child vertices to each other as well as to the parent vertices. Again, each child vertex becomes a parent vertex of one or more of the additional polygons. The result is that the rendered object is comprised of both smaller polygons and a greater number of polygons than it was comprised of after adding the first level of detail, thereby giving the rendered object a higher level of detail than it had after adding the first level of detail.

Figure 3A:
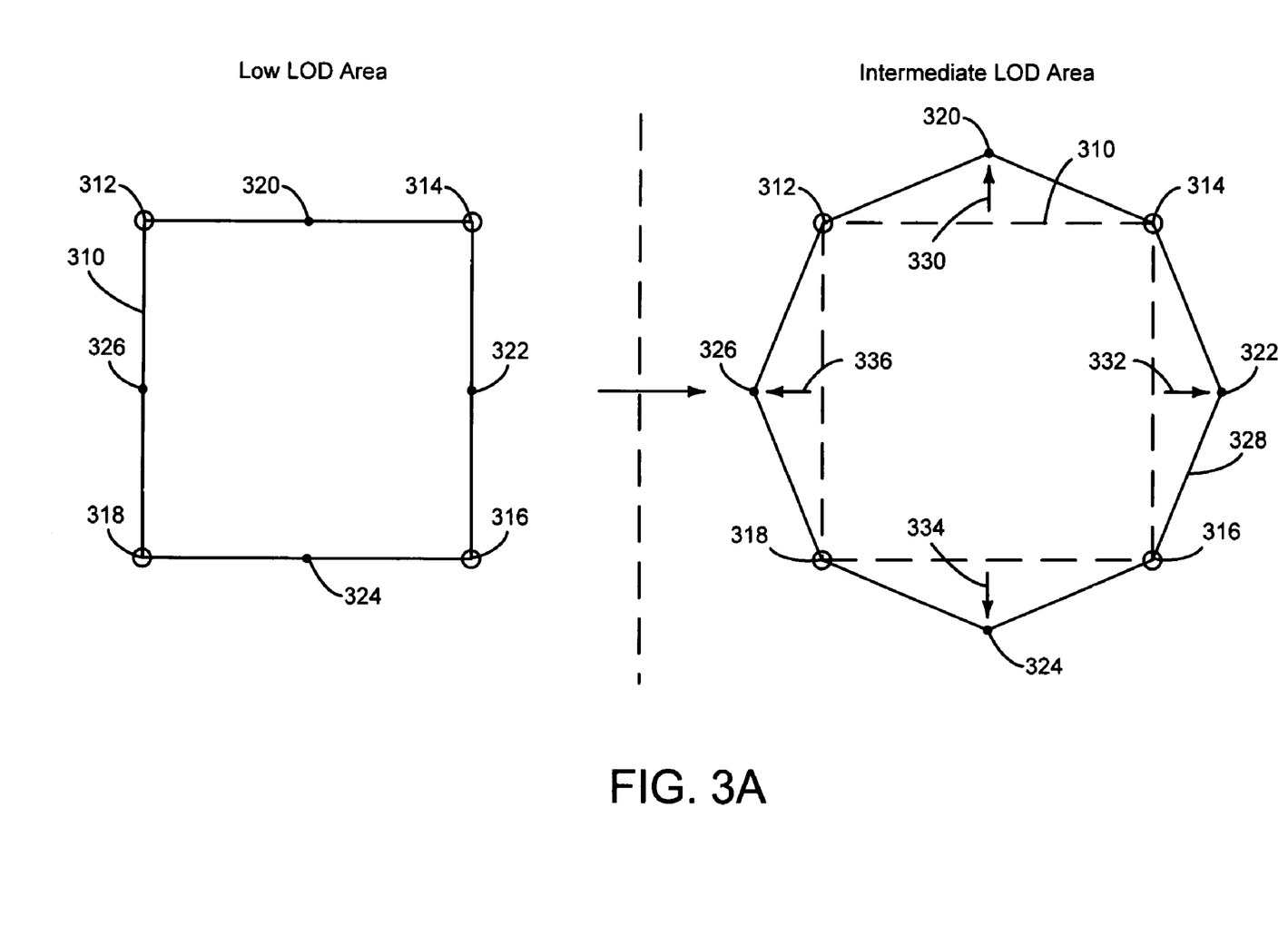
FIGS. 3A and 3B are diagrams illustrating how a graphics engine uses parent vertices and child vertices to add detail to a rendered object as described in conjunction with FIG. 2.
Figure 3B:
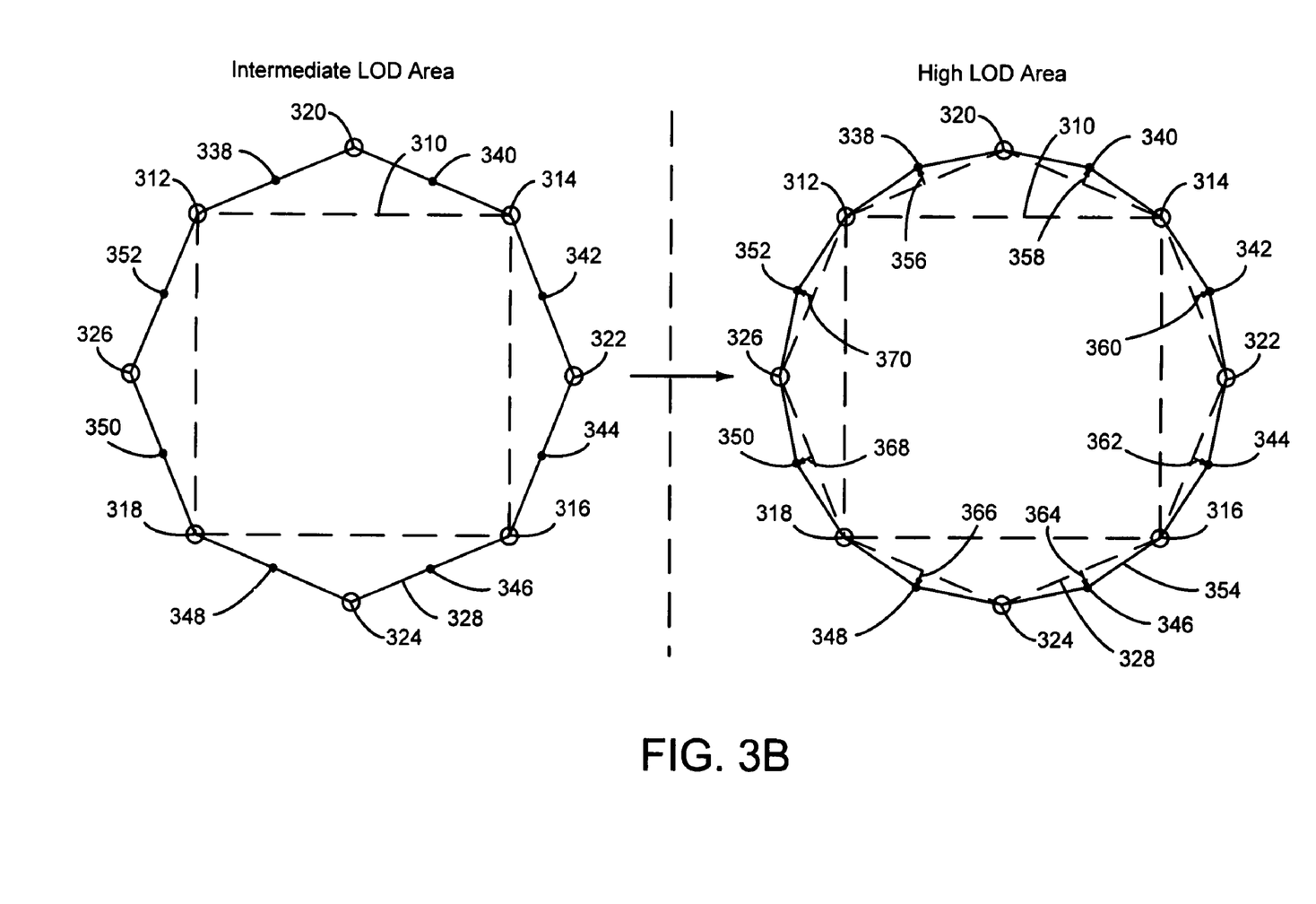

FIGS. 3A and 3B are diagrams illustrating how the graphics engine uses parent vertices and child vertices to add detail to a rendered object 310 as described in conjunction with FIG. 2. More specifically, FIG. 3A illustrates the graphics engine's adding detail as rendered object 310 moves from a low LOD area of an image screen to an intermediate LOD area. As shown, rendered object 310 appears as a square in the low LOD area. For simplicity of illustration, assume that one can model rendered object 310 as a single polygon having four parent vertices 312, 314, 316 and 318.

As rendered object 310 moves in the image screen from the low LOD area to the intermediate LOD area, the graphics engine adds detail to rendered object 310. As discussed in conjunction with FIG. 2, to add the necessary detail, the graphics engine first generates child vertices 320, 322, 324 and 326 such that each set of parent vertices of rendered object 310 has a child vertex. For example, child vertex 320 is the child of parent vertices 312 and 314, child vertex 322 is the child of parent vertices 314 and 316, child vertex 324 is the child of parent vertices 316 and 318 and child vertex 326 is the child of parent vertices 312 and 318.

The graphics engine then moves each child vertex to a predetermined location within the anticipated contours of rendered object 328. Migration paths 330, 332, 334 and 336 show the paths over which the graphics engine moves each of child vertices 320, 322, 324 and 326, respectively.

The graphics engine also generates additional polygons within the contours of rendered object 310 to provide rendered object 310 with the requisite amount of additional detail. For simplicity of illustration, FIG. 3A shows only the sides of the additional polygons that constitute connections between child vertices 320, 322, 324 and 326 and parent vertices 312, 314, 316 and 318. The result is a rendered object 328, an octagon, that has more detail than rendered object 310, a square.

FIG. 3B illustrates the graphics engine's adding detail as rendered object 328 moves from the intermediate LOD area of the image screen to a high LOD area. As shown, rendered object 328 appears as an octagon in the intermediate LOD area. Again, for simplicity of illustration, assume that one can model rendered object 328 as a single polygon having eight parent vertices 312, 314, 316, 318, 320, 322, 324 and 326.

As rendered object 328 moves in the image screen from the intermediate LOD area to the high LOD area, the graphics engine adds detail to rendered object 328. Again, to add the necessary detail, the graphics engine first generates child vertices 338, 340, 342, 344, 346, 348, 350 and 352 such that each set of parent vertices of rendered object 328 has a child vertex. For example, child vertex 338 is the child of parent vertices 312 and 320, child vertex 340 is the child of parent vertices 314 and 320, child vertex 342 is the child of parent vertices 314 and 322, child vertex 344 is the child of parent vertices 316 and 322, child vertex 346 is the child of parent vertices 316 and 324, child vertex 348 is the child of parent vertices 318 and 324, child vertex 350 is the child of parent vertices 318 and 326 and child vertex 352 is the child of parent vertices 312 and 326.

The graphics engine then moves each child vertex to a predetermined location within the anticipated contours of rendered object 354. Migration paths 356, 358, 360, 362, 364, 366, 368 and 370 show the paths over which the graphics engine moves each of child vertices 338, 340, 342, 344, 346, 348, 350 and 352, respectively.

Again, the graphics engine also generates additional polygons within the contours of rendered object 328 to provide rendered object 328 with the requisite amount of additional detail. For simplicity of illustration, FIG. 3B shows only the sides of the additional polygons that constitute connections between child vertices 338, 340, 342, 344, 346, 348, 350 and 352 and parent vertices 312, 314, 316, 318, 320, 322, 324 and 326. The result is a rendered object 354, a sixteen-sided polygon, that has more detail than rendered object 328, an octagon.

The graphics engine can remove detail from either rendered object 354 or rendered object 328 by simply reversing the steps described above. For example, if rendered object 354 moves from the high LOD area of the image screen to the intermediate LOD area, the graphics engine can reverse the steps set forth in conjunction with FIG. 3B to remove detail from rendered object 354 and transform rendered object 354 into rendered object 328. Likewise, if rendered object 328 moves from the intermediate LOD area of the image screen to the low LOD area, the graphics engine can reverse the steps set forth in conjunction with FIG. 3A to remove detail from rendered object 328 and transform rendered object 328 into rendered object 310.

The examples set forth in conjunction with FIGS. 3A and 3B parallel a situation where a circular object, such as a car tire, is a rendered object in an image screen, and the car tire moves among different LOD areas of the image screen. When the car tire is in the background of the overall image, the car tire resides in the low LOD area of the image screen. The image system shows the car tire as a square because the car tire is so small relative to the rest of the image that an image system user is unable to distinguish between a square and a circle. The square car tire therefore appears circular to the user.

As the car tire moves more into the foreground of the overall image, the car tire resides in the intermediate LOD area of the image screen. Here, the image system has to present the car tire with more detail because the car tire is larger relative to the rest of the image, enabling the image system user to see the car tire more clearly. For this reason, the image system presents the car tire as an octagon with more detail than the square version of the car tire.

As the car tire continues to move farther into the foreground of the overall image, the car tire resides in the high LOD area of the image screen. Here, the image system has to present the car tire with even more detail than the octagon version of the car tire because the car tire is larger and more clearly seen by the image system user than the octagon version. The image system therefore presents the car tire as a sixteen-sided polygon with more detail than the octagon version of the car tire. As the car tire moves closer and closer to the image system user, the graphics engine represents the car tire as a polygon with an increasing number of sides and amount of detail. In the limit, the shape of the car tire approaches that of an actual circle.

Figure 4:
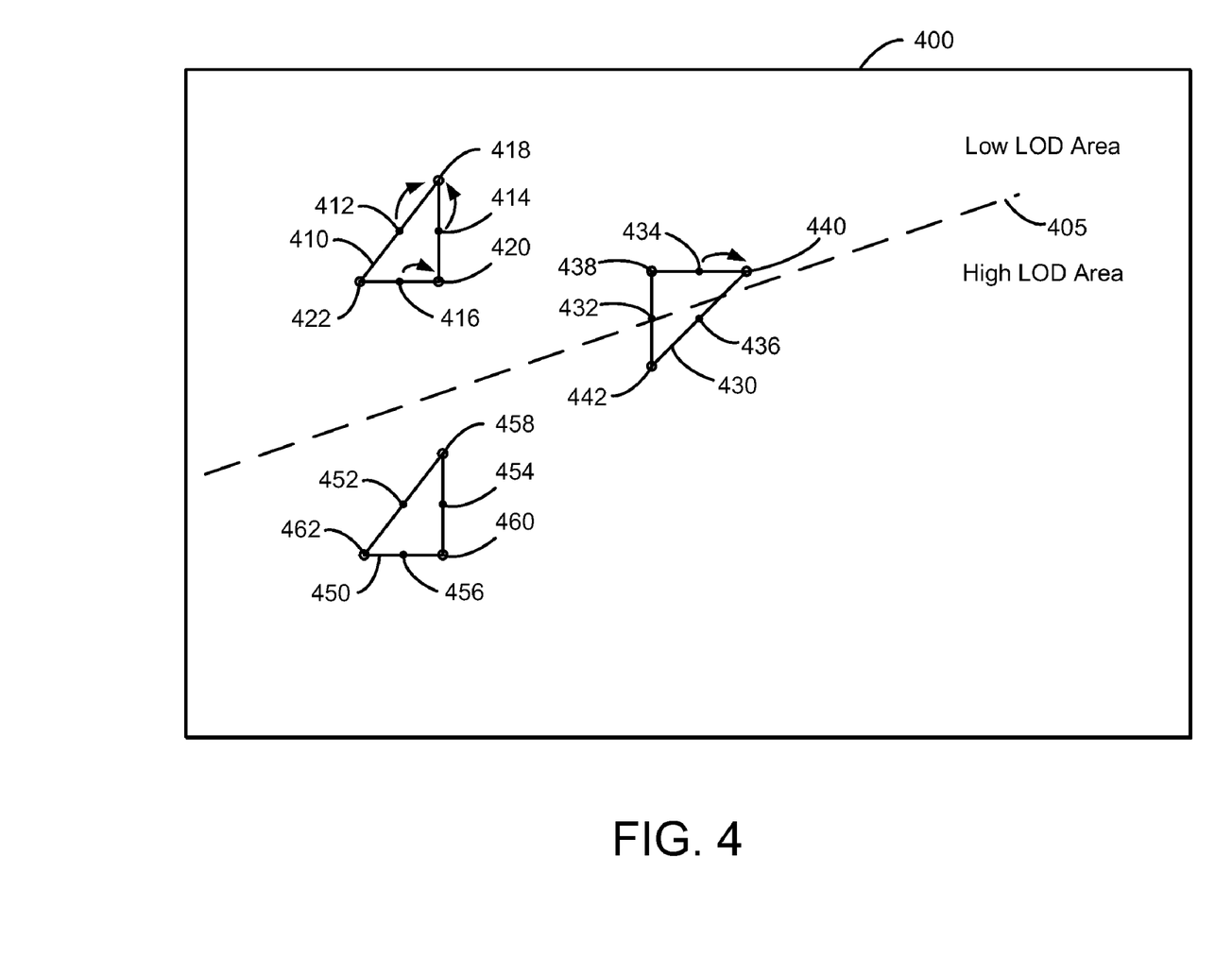
FIG. 4 is diagram illustrating a point pushing technique rule, according to one embodiment of the invention.

FIG. 4 is diagram illustrating a point pushing technique rule, according to one embodiment of the invention. As shown, three polygons 410, 430 and 450 are displayed in an image screen 400. Polygon 410 has three parent vertices 418, 420 and 422 and three child vertices 412, 414 and 416. Polygon 430 has three parent vertices 438, 440 and 442 and three child vertices 432, 434 and 436. Polygon 450 has three parent vertices 458, 460 and 462 and three child vertices 452, 454 and 456. An LOD boundary 405 divides-image screen 400 into a low LOD area and a high LOD area.

The point pushing technique rule, according to one embodiment of the invention, is as follows. If both parent vertices of a child vertex reside on the low LOD side of the LOD boundary, the graphics engine pushes or moves that child vertex to one of its parent vertices. The system implementing the rule predetermines the parent vertex to which the graphics engine pushes the child vertex (referred to as the "predetermined parent vertex"). If, however, either of the parent vertices of a child vertex resides on the high LOD side of the LOD boundary, the graphics engine does not push or move that child vertex—rather, that child vertex remains in its original position.

The point pushing technique rule applies to polygon 410 as follows. The parents of child vertex 412, parent vertices 418 and 422, both reside on the low LOD side of LOD boundary 405. According to the rule, the graphics engine pushes child vertex 412 to predetermined parent vertex 418, as the arrow in FIG. 4 depicts. The parents of child vertex 414, parent vertices 418 and 420, both reside on the low LOD side of LOD boundary 405. According to the rule, the graphics engine pushes child vertex 414 to predetermined parent vertex 418, as the arrow in FIG. 4 depicts. The parents of child vertex 416, parent vertices 420 and 422, both reside on the low LOD side of LOD boundary 405. Again, according to the rule, the graphics engine pushes child vertex 416 to predetermined parent vertex 420, as the arrow in FIG. 4 depicts.

The point pushing technique rule applies to polygon 430 as follows. The parents of child vertex 434, parent vertices 438 and 440, both reside on the low LOD side of LOD boundary 405. According to the rule, the graphics engine pushes child vertex 434 to predetermined parent vertex 440, as the arrow in FIG. 4 depicts. The parents of child vertex 436, parent vertices 440 and 442, reside on opposite sides of LOD boundary 405. According to the rule, child vertex 436 does not move, remaining in its original position. Similarly, the parents of child vertex 432, parent vertices 438 and 442, reside on opposite sides of LOD boundary 405. According to the rule, child vertex 432 also does not move, remaining in its original position.

The point pushing technique rule applies to polygon 450 as follows. The parents of child vertex 452, parent vertices 458 and 462, both reside on the high LOD side of LOD boundary 405. According to the rule, child vertex 452 does not move, remaining in its original position. The parents of child vertex 454, parent vertices 458 and 460, both reside on the high LOD side of LOD boundary 405. According to the rule, child vertex 454 does not move, remaining in its original position. The parent vertices of child vertex 456, parent vertices 460 and 462, both reside on the high LOD side of LOD boundary 405. Again, according to the rule, child vertex 456 also does not move, remaining in its original position.

As discussed in conjunction with FIGS. 3A and 3B, when a rendered object moves from a high LOD to a low LOD area in the image screen, the graphics engine removes detail from the rendered object. The graphics engine accomplishes this objective by removing polygons from the rendered object until the rendered object has an amount of detail commensurate with the low LOD.

Related to the foregoing, when a rendered object moves in an image screen, differing types of LOD boundaries intersect the arrays of polygons or meshes into which the graphics engine has divided the image screen. In a situation where a particular mesh initially resides in a high LOD area of the image screen, and then a rendered object moves, causing an LOD boundary to divide the mesh into a low LOD area and a high LOD area, the graphics engine has to remove detail from the low LOD area of the mesh. Similar to removing detail from a rendered object, the graphics engine removes detail from the low LOD area of the mesh by removing polygons in that area until that part of the mesh has an amount of detail commensurate with the low LOD.

The discussion set forth below in conjunction with FIGS. 5A, 5B, 6 and 7 discloses how the graphics engine uses the point pushing method of the present invention to remove detail from any area of an array of polygons while (i) avoiding the T-junction problem described above in conjunction with the prior art and (ii) preserving the graphics engine's ability to generate polygons through stripping.

Figure 5A:
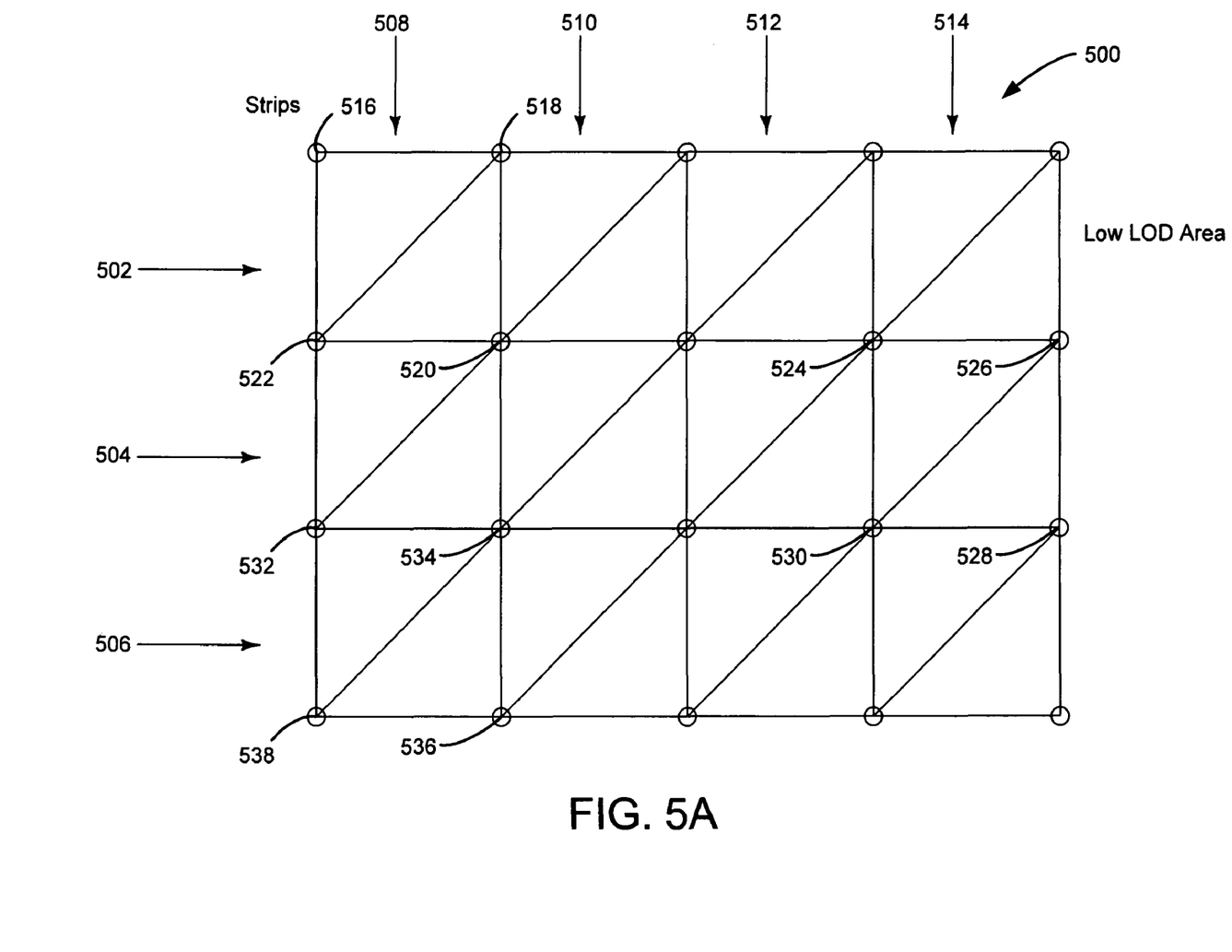
FIG. 5A is a diagram illustrating one embodiment of a mesh located in a low LOD area of an image screen, according to the invention.

FIG. 5A is a diagram illustrating one embodiment of a mesh 500 located in a low LOD area of an image screen, according to the invention. Mesh 500 is one embodiment of an array of polygons arranged in horizontal and vertical strips. As shown, mesh 500 contains three horizontal strips of polygons 502, 504 and 506 and four vertical strips of polygons 508, 510, 512 and 514. Parent vertices of the various polygons also are shown. For example, parent vertices 516, 518 and 522 are the vertices of one polygon, parent vertices 518, 520 and 522 are the vertices of one polygon, parent vertices 524, 526 and 530 are the vertices of one polygon, parent vertices 526, 528 and 530 are the vertices of one polygon, parent vertices 532, 534 and 538 are the vertices of one polygon and parent vertices 534, 536 and 538 are the vertices of yet another polygon.

Figure 5B:
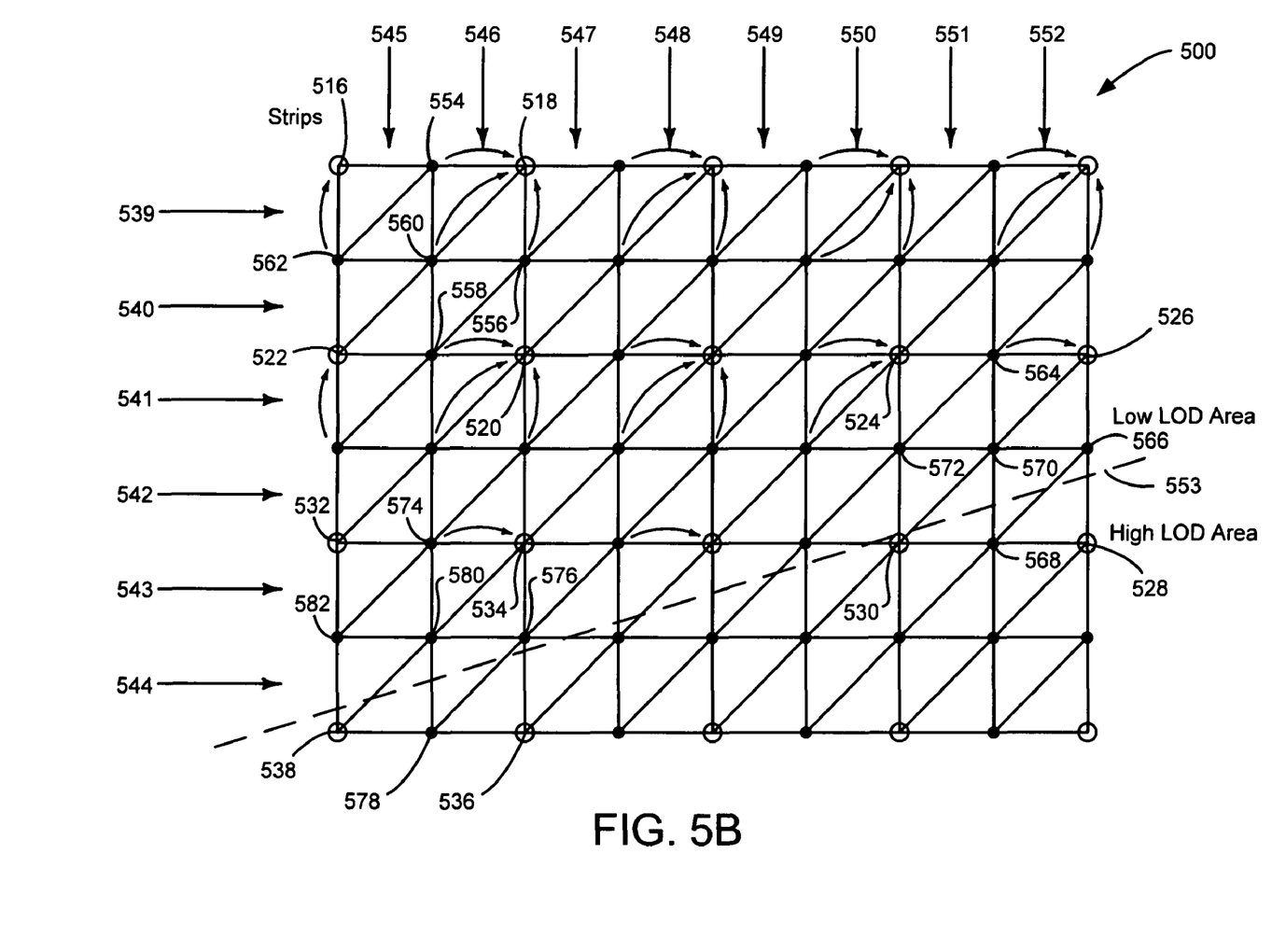
FIG. 5B is a diagram illustrating the mesh of FIG. 5A when located in a high LOD area of an image screen as well as the graphics engine's application of the point pushing technique rule to remove detail from a low LOD area of the mesh, according to one embodiment of the invention.

FIG. 5B is a diagram illustrating mesh 500 of FIG. 5A when located in a high LOD area of an image screen as well as the graphics engine's application of the point pushing technique rule to remove detail from a low LOD area of mesh 500, according to one embodiment of the invention. As shown, mesh 500 contains six horizontal strips of polygons 539, 540, 541, 542, 543 and 544 and eight vertical strips of polygons 545, 546, 547, 548, 549, 550, 551 and 552 when located in the high LOD area of the image screen. As seen by comparing FIGS. 5A and 5B, mesh 500 contains both smaller polygons and a greater number of polygons when located in the high LOD area of the image screen as compared to when located in the low LOD area. For this reason, mesh 500 shows more detail when located in the high LOD area of the image screen than when located in the low LOD area of the image screen.

More specifically, FIG. 5B shows that mesh 500 contains four times as many polygons when located in the high LOD area of the image screen than when located in the low LOD area. The graphics engine generates the polygons such that, in the high LOD area, mesh 500 effectively contains four polygons for every one of the polygons depicted in FIG. 5A (each referred to as an "original polygon"). For example, the graphics engine effectively has replaced the original polygon defined by vertices 516, 518 and 522 (as seen in FIG. 5A) with the polygon defined by vertices 516, 554 and 562, the polygon defined by vertices 554, 518 and 560, the polygon defined by vertices 554, 560 and 562 and the polygon defined by vertices 562, 560 and 522. Likewise, the graphics engine effectively has replaced the original polygon defined by vertices 526, 528 and 530 (as seen in FIG. 5A) with the polygon defined by vertices 526, 566 and 570, the polygon defined by vertices 570, 566 and 568, the polygon defined by vertices 570, 568 and 530 and the polygon defined by vertices 566, 528 and 568.

FIG. 5B also shows the child vertex of each set of parent vertices of each of the original polygons. For example, child vertex 554 is the child of parent vertices 516 and 518, child vertex 556 is the child of parent vertices 518 and 520, child vertex 558 is the child of parent vertices 520 and 522, child vertex 560 is the child of parent vertices 518 and 522 and child vertex 562 is the child of parent vertices 516 and 522. Similarly, child vertex 564 is the child of parent vertices 524 and 526, child vertex 566 is the child of parent vertices 526 and 528, child vertex 578 is the child of 536 and 538, child vertex 580 is the child of parent vertices 534 and 538 and child vertex 582 is the child of parent vertices 532 and 538.

Also shown in FIG. 5B is an LOD boundary 553 that intersects mesh 500 to create a low LOD area on one side of LOD boundary 553 and a high LOD area on the other side of LOD boundary 553. As discussed in more detail in conjunction with FIGS. 6 and 7, the graphics engine uses the point pushing method of the present invention to remove detail from the low LOD area of mesh 500. The arrows depicted in FIG. 5B indicate the predetermined parent vertex to which the graphics engine pushes each child vertex according to one embodiment of the point pushing technique rule. For example, according to the rule, the graphics engine pushes child vertex 554 to predetermined parent vertex 518 because both parent vertices 516 and 518 reside on the low LOD side of LOD boundary 553. Similarly, according to the rule, the graphics engine pushes child vertex 574 to predetermined parent vertex 534 because both parent vertices 532 and 534 reside on the low LOD side of LOD boundary 553. By contrast, according to the rule, child vertex 570 remains in its original position because parent vertex 526 resides on the low LOD side of LOD boundary 553 and parent vertex 530 resides on the high LOD side of LOD boundary 553. Similarly, according to the rule, child vertex 578 remains in its original position because both parent vertices 536 and 538 reside on the high LOD side of LOD boundary 553.

Figure 6:
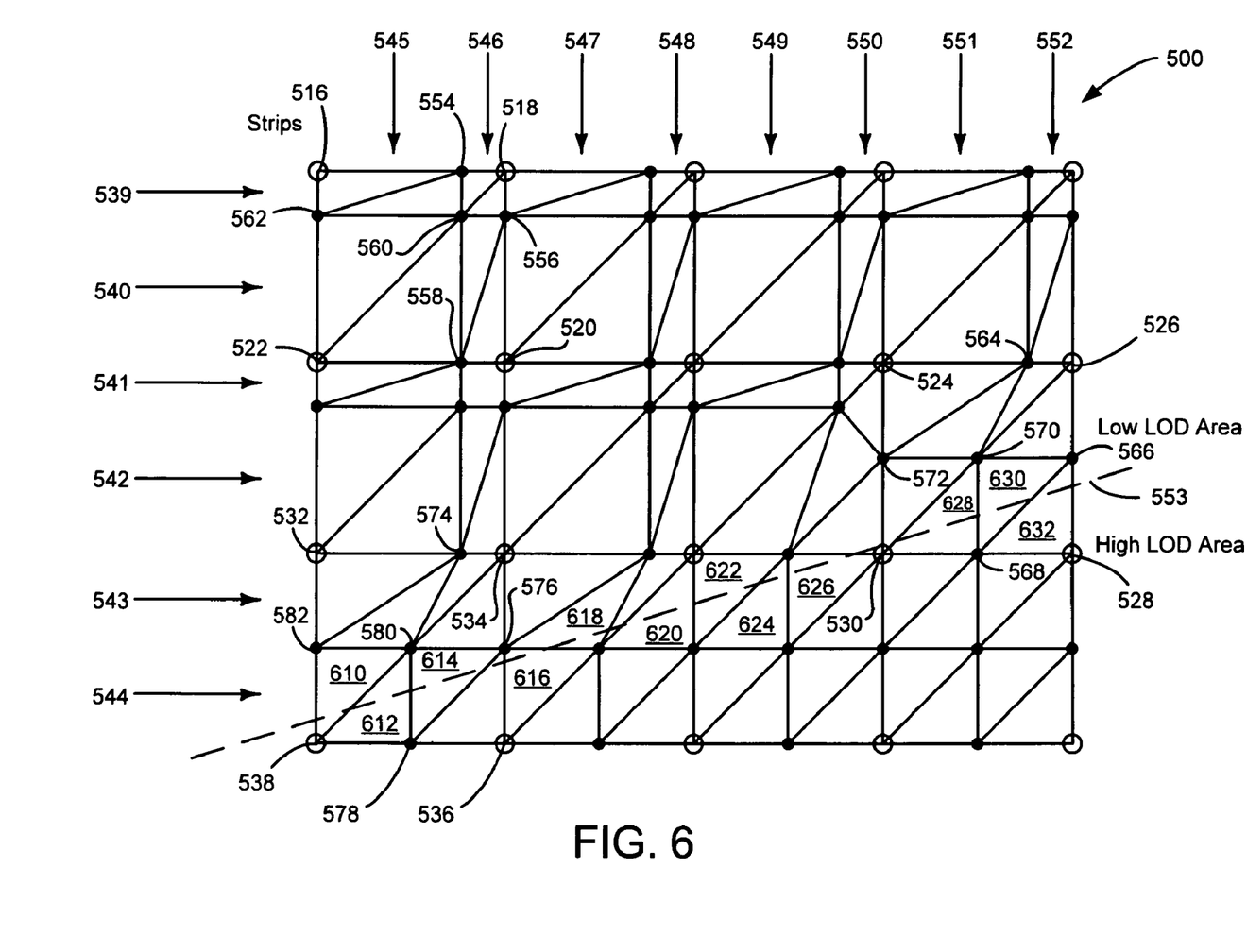
FIG. 6 is a diagram illustrating the migration of the child vertices of FIG. 5B to the predetermined parent vertices of FIG. 5B.

FIG. 6 is a diagram illustrating the migration of the child vertices of FIG. 5B to the predetermined parent vertices of FIG. 5B. As shown, the graphics engine has pushed certain child vertices located in the low LOD area of mesh 500 partly towards their respective predetermined parent vertices as dictated by the point pushing technique rule applied to mesh 500 as shown in FIG. 5B. For example, as both indicated in FIG. 5B and shown in FIG. 6, the graphics engine has pushed child vertex 562 towards predetermined parent vertex 516, child vertices 554, 556 and 560 towards predetermined parent vertex 518, child vertex 558 towards predetermined parent vertex 520, child vertex 564 towards predetermined parent vertex 526 and child vertex 574 towards predetermined parent vertex 534. As also indicated in FIG. 5B and shown in FIG. 6, child vertices 566, 568, 570 and 572 as well as child vertices 576, 578, 580 and 582 remain in their original positions because either one (or both) of the parent vertices of each of these child vertices resides on the high LOD side of LOD boundary 553.

As seen in FIG. 6, as certain child vertices in the low LOD area of mesh 500 migrate towards their respective predetermined parent vertices, portions of strips 539, 541, 546, 548, 550 and 552 become narrower as many of the polygons in these strips begin to collapse. By contrast, portions of strips 540, 542, 545, 547, 549 and 551 simultaneously become wider. The result is that the polygons located at the intersections of strips 540 and 545, strips 542 and 545, strips 540 and 547, strips 542 and 547, strips 540 and 549, strips 542 and 549 and strips 540 and 551 increase in size as these polygons fill the space relinquished by the collapsing polygons. The consequence of this phenomenon is that larger and fewer polygons begin to dominate the low LOD area of mesh 500, which decreases the amount of detail in that area of mesh 500.

Importantly, FIG. 6 shows that the graphics engine preserves the integrity of each strip in mesh 500 as the various child vertices migrate towards their respective predetermined parent vertices. Although several of the polygons in the strips have not retained their original shapes as right triangles, each strip nonetheless keeps its shape from one end of mesh 500 to the other.

Further, the point pushing method of the present invention enables the graphics engine to collapse polygons in the low LOD area of mesh 500 without creating or using T-junctions at the LOD boundary. FIG. 6 shows that point pushing causes several transition polygons to form along LOD boundary 553. Polygons 610, 612, 614, 616, 618, 620, 622, 624, 626, 628, 630 and 632 are examples of transition polygons. These transition polygons straddle LOD boundary 553 to create a small and effective transition area between the polygons in the low LOD area of mesh 500 and the polygons in the high LOD area. No cracks appear in the image screen because the transition polygons completely fill the transition area, thereby eliminating T-junctions at the boundary between the high resolution patch and the low resolution patch where the patches share vertices. By using the point pushing technique, the graphics engine avoids having to align a high resolution patch and a low resolution patch, the misalignment of which is a frequent source of cracks.

Figure 7:
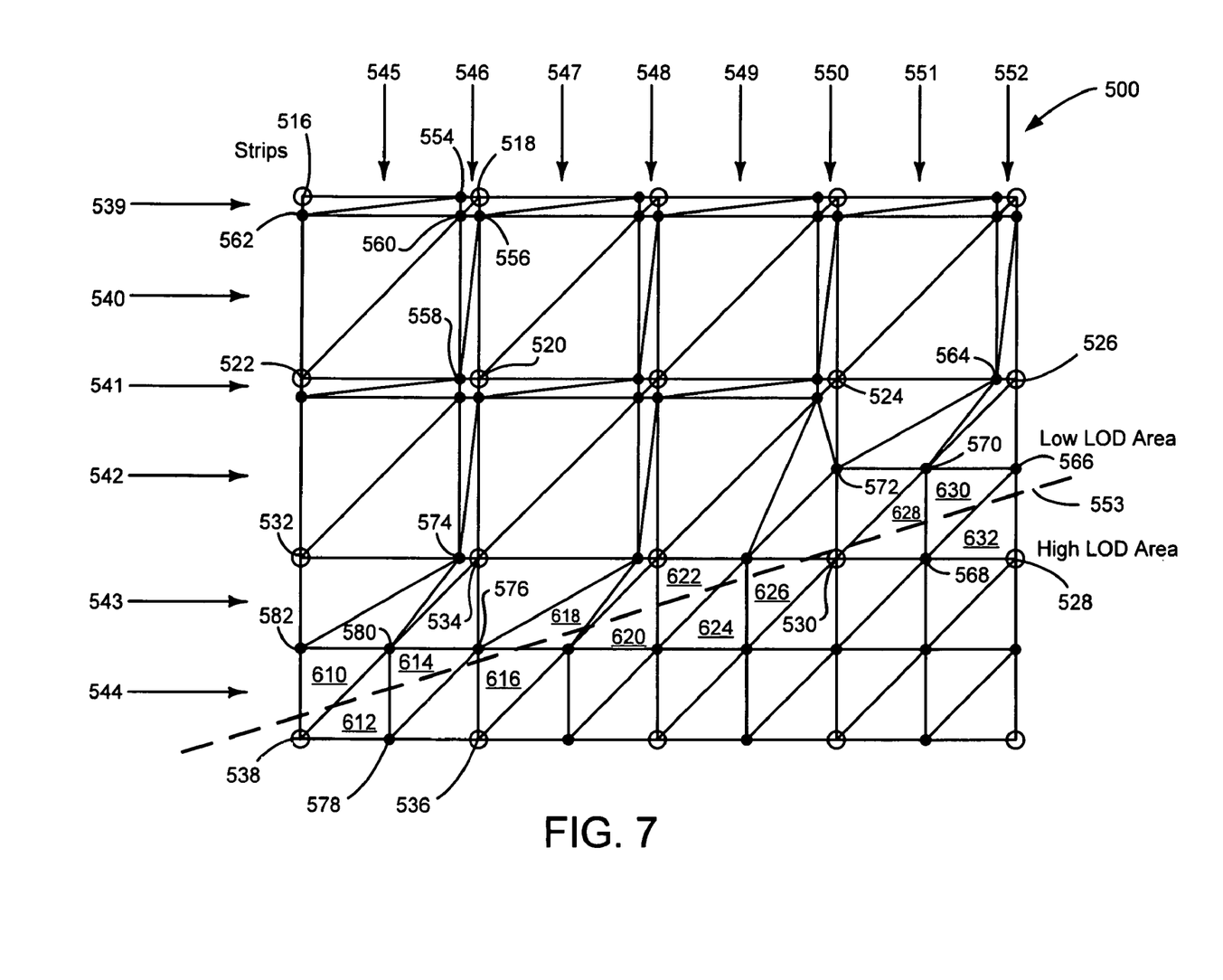
FIG. 7 is a diagram illustrating further migration of the child vertices of FIG. 5B to the predetermined parent vertices of FIG. 5B.

FIG. 7 is a diagram illustrating the further migration of the child vertices of FIG. 5B to the predetermined parent vertices of FIG. 5B. As shown, the graphics engine has pushed certain child vertices located in the low LOD area of mesh 500 much closer to their respective predetermined parent vertices as dictated by the point pushing technique rule. For example, as seen in FIG. 7, the graphics engine has pushed child vertex 562 closer to predetermined parent vertex 516, child vertices 554, 556 and 560 closer to predetermined parent vertex 518, child vertex 558 closer to predetermined parent vertex 520, child vertex 564 closer to predetermined parent vertex 526 and child vertex 574 closer to predetermined parent vertex 534. Again, as also shown in FIG. 6, child vertices 566, 568, 570 and 572 as well as child vertices 576, 578, 580 and 582 continue to remain in their original positions because either one (or both) of the parent vertices of each of these child vertices resides on the high LOD side of LOD boundary 553.

As seen in FIG. 7, as certain child vertices in the low LOD area of mesh 500 migrate further towards their respective predetermined parent vertices, strips 539, 541, 546, 548, 550 and 552 become even narrower as many of the polygons in those strips collapse even further. Again, by contrast, strips 540, 542, 545, 547, 549 and 551 simultaneously become even wider. The polygons located at the intersections of strips 540 and 545, strips 542 and 545, strips 540 and 547, strips 542 and 547, strips 540 and 549, strips 542 and 549 and strips 540 and 551 continue to increase in size as these polygons continue to fill the space relinquished by the collapsing polygons. The continued consequence of this phenomenon is that a few large polygons dominate the low LOD area of mesh 500, which decreases even further the amount of detail in that area of mesh 500.

One can see from FIG. 7 that the graphics engine continues to preserve the integrity of each strip as the migration of the child vertices towards their respective predetermined parent vertices continues. One also can see that when the various child vertices complete their migrations, many of the polygons in strips 539, 541, 546, 548, 550 and 552 will collapse fully and disappear. The result is that the low LOD area of mesh 500 will look substantially similar to mesh 500 as depicted in FIG. 5A (when all of mesh 500 is located in the low LOD area of the image screen). Further, the high LOD area of mesh 500 will look substantially similar to mesh 500 as depicted in FIG. 5B (when all of mesh 500 is located in the high LOD area of the image screen). Lastly, as discussed above in conjunction with FIG. 6, once the child vertices complete their migrations, transition polygons will reside between the polygons in the low LOD area of mesh 500 and the polygons in the high LOD area, creating a continuous transition area without cracks. The consequence is that no T-junctions will exist at the boundary between the high resolution patch and the low resolution patch where the patches share vertices.

Figure 8:
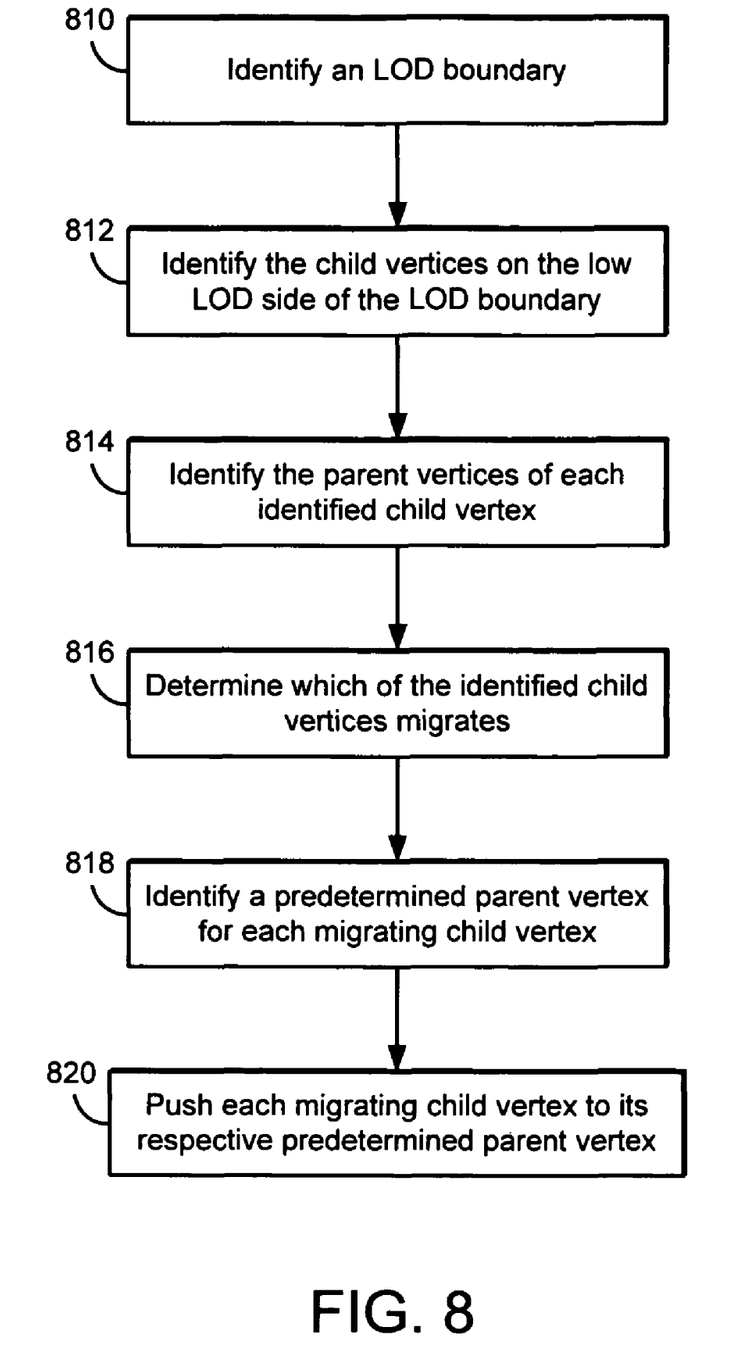
FIG. 8 is a flowchart of method steps for pushing child vertices to predetermined parent vertices to remove detail from an array of polygons, according to one embodiment of the invention.

FIG. 8 is a flowchart of method steps for pushing child vertices to predetermined parent vertices to remove detail from a low LOD area of an array of polygons, according to one embodiment of the invention. Although the method steps are described in the context of the graphics engine, which is a subsystem of system 100 illustrated in FIG. 1, any type of system, engine, processor, combination of processors or software configured to perform the method steps is within the scope of the invention.

As shown in FIG. 8, in step 810, the graphics engine identifies an LOD boundary that divides an array of polygons into a low LOD area and a high LOD area. As discussed above in conjunction with FIGS. 2 through 5B, these different levels of detail are measured relative to one another. In step 812, the graphics engine identifies every child vertex in the array of polygons that resides on the low LOD side of the LOD boundary. In step 814, the graphics engine identifies the parent vertices of each such child vertex.

Next, in step 816, the graphics engine determines which, if any, of the child vertices residing on the low LOD side of the LOD boundary migrates to a parent vertex. The graphics engine uses a point pushing technique rule to make this determination. According to one embodiment of the rule, a child vertex migrates to one of its parent vertices if both parent vertices reside on the low LOD side of the LOD boundary. A child vertex does not migrate, however, if either of its parent vertices resides on the high LOD side of the LOD boundary.

In step 818, for each child vertex that migrates, the graphics engine identifies the parent vertex of the child to which the graphics engine moves that child vertex. As discussed above in conjunction with FIG. 4, each of these parent vertices is referred to as a "predetermined parent vertex." Lastly, in step 820, the graphics engine pushes or moves each migrating child vertex to its respective predetermined parent vertex.

As described above in conjunction with FIGS. 6 and 7, when the child vertices complete their migrations to their respective predetermined parent vertices, the low LOD area of the array of polygons has less detail than the high LOD area. Further, the strips of polygons in the array of polygons retain their integrity, and no cracks appear between the low LOD area of the array of polygons and the high LOD area.

To add detail to an array of polygons located in a low LOD area of an image screen, according to another embodiment of the invention, the graphics engine essentially reverses the processes described above in conjunction with FIGS. 5A through 8. The graphics engine first identifies an LOD boundary that divides the array of polygons into a high LOD area and a low LOD area. The graphics engine then identifies every predetermined parent vertex on the high LOD side of the LOD boundary. The graphics engine also identifies each child vertex having the same position as any of the identified parent vertices and the other parent vertex of each such child vertex (note that the predetermined parent vertex is one of the parents of the child vertex at the same position).

Next, the graphics engine determines which, if any, of these child vertices migrates. The graphics engine again uses a point pushing technique rule to make this determination. In one embodiment, the point pushing technique rule dictates that a child vertex migrates if both of its parent vertices reside on the high LOD side of the LOD boundary. A child vertex does not migrate, however, if either of its parent vertices resides on the low LOD side of the LOD boundary.

Lastly, the graphics engine pushes each child vertex that migrates to a predetermined location. When these child vertices complete their migrations to their respective predetermined locations, the large polygons that initially resided in the high LOD area of the array of polygons will have decreased in size. Further, the graphics engine will have generated additional polygons in the high LOD area of the array of polygons by connecting the migrating child vertices to each other and to the parent vertices residing in the high LOD area. The result is that the high LOD area of the array of polygons will have both smaller polygons and a greater number of polygons than the low LOD area, which increases the amount of detail in the high LOD area.

Similar to when removing detail from an array of polygons, the graphics engine preserves the integrity of the strips of polygons in the array of polygons when adding detail to the high LOD area of the array. Further, the graphics engine generates transition polygons on either side of the LOD boundary, which prevents cracks from appearing between the low LOD area of the array of polygons and the high LOD area.

The invention has been described above with reference to specific embodiments. Persons skilled in the art, however, will understand that various modifications and changes may be made thereto without departing from the broader spirit and scope of the invention as set forth in the appended claims. For example, for simplicity of illustration, the embodiments of the invention referenced in the discussion and examples set forth above include arrays of polygons containing small numbers of polygons with simple geometries (i.e., triangles). Other embodiments of the invention, though, can include arrays of polygons containing any number of polygons with any type of shape, whether simple or complex. The foregoing description and drawings are, accordingly, to be regarded in an illustrative rather than a restrictive sense.

What is claimed is:

1. A graphics engine for controlling a level of detail in a rendered object, the graphics engine configured to:
   identify a set of parent vertices defining corners of a polygon within the rendered object, the set of parent vertices comprising one or more parent vertices in a low level of detail area and one or more parent vertices in a high level of detail area, wherein sides of the polygon are defined by connecting corresponding pairs of parent vertices in the set of parent vertices;
   generate a corresponding child vertex for each pair of parent vertices, each child vertex connected to the corresponding pair of parent vertices;
   connect each child vertex to at least one other child vertex;
   determine whether both parent vertices of each corresponding pair of parent vertices that defines a side of the polygon lie within the low level of detail area; and
   relocate a corresponding child vertex along a side of the polygon toward a predetermined parent vertex in the corresponding pair of parent vertices following the determination that both parent vertices in the corresponding pair of parent vertices lie within the low level of detail.

2. The graphics engine of claim 1, wherein the graphics engine is further configured to connect each child vertex to at least two other child vertices to generate at least one additional polygon, the at least one additional polygon affecting the level of detail in the rendered object.

3. The graphics engine of claim 1, wherein the graphics engine is further configured to generate additional polygons if the level of detail of all the polygons in the rendered object increases.

4. The graphics engine of claim 1, wherein the graphics engine is configured to use a stripping algorithm to generate an additional polygon.

5. The graphics engine of claim 1, wherein the graphics engine is further configured to remove a polygon from the rendered object by merging one of the parent vertices of the polygon with another of the parent vertices.

6. A computer-implemented method for controlling a level of detail within a rendered object, the method comprising:

executing instructions stored in memory to identify a set of parent vertices defining corners of a polygon within the rendered object, the set of parent vertices comprising one or more parent vertices in a low level of detail area and one or more parent vertices in a high level of detail area, wherein sides of the polygon are defined by connecting corresponding pairs of parent vertices in the set of parent vertices;

executing instructions stored in memory to generate a corresponding child vertex for each pair of parent vertices, each child vertex connected to the corresponding pair of parent vertices;

executing instructions stored in memory to connect each child vertex to at least one other child vertex;

executing instructions stored in memory to determine whether both parent vertices of each corresponding pair lie within the low level of detail area; and executing instructions stored in memory to relocate a corresponding child vertex along a side of the polygon toward a predetermined parent vertex in the corresponding pair of parent vertices following the determination that both parent vertices in the corresponding pair of parent vertices lie within the low level of detail.

7. The method of claim 6, further comprising executing instructions stored in memory to connect each child vertex to at least two other child vertices to generate at least one additional polygon, the at least one additional polygon affecting the level of detail in the rendered object.

8. The method of claim 6, further comprising executing instructions stored in memory to generate additional polygons if the level of detail of all the polygons in the rendered object increases.

9. The method of claim 6, further comprising executing instructions stored in memory to use a stripping algorithm to generate an additional polygon.

10. The method of claim 6, further comprising executing instructions stored in memory to remove a polygon from the rendered object by merging one of the parent vertices of the polygon with another of the parent vertices.

11. A non-transitory machine readable storage medium having a program embodied thereon, the program having instructions executable by a processor to perform a method for controlling a level of detail in a rendered object, the method comprising:

identifying a set of parent vertices defining corners of a polygon within the rendered object, the set of parent vertices comprising one or more parent vertices in a low level of detail area and one or more parent vertices in a high level of detail area, wherein sides of the polygon are defined by connecting corresponding pairs of parent vertices in the set of parent vertices;

generating a corresponding child vertex for each pair of parent vertices, each child vertex connected to the corresponding pair of parent vertices;

connecting each child vertex to at least one other child vertex;

determining whether both parent vertices of each corresponding pair lie within the low level of detail area; and relocating a corresponding child vertex along a side of the polygon toward a predetermined parent vertex in the corresponding pair of parent vertices following the determination that both parent vertices in the corresponding pair of parent vertices lie within the low level of detail.

12. The non-transitory machine readable storage medium of claim 11, wherein the method further comprises connecting each child vertex to at least two other child vertices to generate at least one additional polygon, the at least one additional polygon affecting the level of detail in the rendered object.

13. The non-transitory machine readable storage medium of claim 11, wherein the method further comprises generating additional polygons if the level of detail of all the polygons in the rendered object increases.

14. The non-transitory machine readable storage medium of claim 11, wherein the method further comprises using a stripping algorithm to generate an additional polygon.

15. The non-transitory machine readable storage medium of claim 11, wherein the method further comprises removing a polygon from the rendered object by merging one of the parent vertices of the polygon with another of the parent vertices of the polygon.

* * * * *